United States Patent
Danilak

(10) Patent No.: US 7,526,604 B1
(45) Date of Patent: Apr. 28, 2009

(54) COMMAND QUEUEING SPECULATIVE WRITE PREFETCH

(75) Inventor: Radoslav Danilak, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 619 days.

(21) Appl. No.: 10/914,758

(22) Filed: Aug. 9, 2004

(51) Int. Cl.
G06F 12/00 (2006.01)

(52) U.S. Cl. .................. 711/112; 711/169; 711/137

(58) Field of Classification Search .......... 711/112, 711/169, 137
See application file for complete search history.

(56) References Cited

U.S. PATENT DOCUMENTS

| 5,146,578 | A | * | 9/1992 | Zangenehpour | 711/137 |
| 5,802,569 | A | | 9/1998 | Genduso et al. | |
| 6,092,149 | A | * | 7/2000 | Hicken et al. | 711/113 |
| 6,418,516 | B1 | * | 7/2002 | Arimilli et al. | 711/138 |
| 6,438,673 | B1 | * | 8/2002 | Jourdan et al. | 711/213 |
| 6,820,173 | B1 | * | 11/2004 | Bittel et al. | 711/137 |
| 6,983,359 | B2 | | 1/2006 | Miller | |
| 7,200,719 | B2 | * | 4/2007 | Moyer et al. | 711/137 |
| 2001/0008007 | A1 | * | 7/2001 | Halligan et al. | 711/114 |
| 2003/0079088 | A1 | | 4/2003 | Malik | |
| 2003/0145165 | A1 | * | 7/2003 | Herbst et al. | 711/112 |
| 2004/0006671 | A1 | * | 1/2004 | Handgen et al. | 711/137 |
| 2004/0019745 | A1 | * | 1/2004 | Espeseth et al. | 711/137 |
| 2004/0260883 | A1 | * | 12/2004 | Wallin et al. | 711/137 |
| 2005/0055528 | A1 | | 3/2005 | Arimilli et al. | |
| 2005/0080994 | A1 | * | 4/2005 | Cohen et al. | 711/118 |
| 2005/0262307 | A1 | * | 11/2005 | Chiang et al. | 711/137 |

FOREIGN PATENT DOCUMENTS

EP 1041497 10/2000

* cited by examiner

Primary Examiner—Reginald G Bragdon
Assistant Examiner—Aracelis Ruiz
(74) Attorney, Agent, or Firm—Patterson & Sheridan, LLP

(57) ABSTRACT

Method and apparatus for improving system performance using controlled speculative write prefetching in systems that use command queuing. Speculative write prefetching can be forced on or off, or a determination can be made regarding the benefit versus detriment of speculative write prefetching. The state of the queue switch can be used to determine if speculative write prefetching is to be performed. The state of the queue switch can be set by a queue counter that tracks over time whether speculative write prefetching is or is not beneficial. The content of the queue counter can be controlled by incrementing its value if speculative write prefetching helped and decrementing that value if speculative write prefetching did not help.

13 Claims, 5 Drawing Sheets ns list 203 is sent to disk electronics 206 that

COMMAND QUEUEING SPECULATIVE WRITE PREFETCH

FIELD OF THE INVENTION

This invention generally relates to storage systems. More specifically, this invention relates to using selective prefetch writes in command queuing systems.

BACKGROUND OF THE INVENTION

Computers and other systems have used disk drives for many years to store digital information. This is because while computers and other systems may have sufficient host memory (such as random access memory) to perform ongoing computational tasks, storing large amounts of data, be it an operating system, application programs, or program data, is impractical using anything except a mass storage device such as a disk drive.

FIG. 1 illustrates a typical prior art computer system 100 that includes a main memory 102 for storing programs and data used by a processor 104. The system 100 further includes auxiliary systems that are generically shown as a chipset 106. The chipset 106 includes a disk controller 108 that controls data storage and data integration in the main memory 102 and in a disk drive 110. The disk drive 110 includes drive electronics 112 having a buffer memory 114. Typically, the buffer memory 114 is a dynamic random access memory (DRAM) of 2 MB-8 MB. Data is passed between the host controller 108 and the drive electronics 112 via a bi-directional bus 116. To enable integration of the various components of the system 100, that system operates under the control of an operating system 118.

While there are many types of disk drives, including floppy disks and optical disks, probably the most widely used is the hard disk drive. A hard disk drive can record massive amounts of digital information on concentric memory tracks of a magnetic medium that coats one or more disks. The digital information is recorded as magnetic transitions within the magnetic medium. The disks are mounted on a spindle and turned at very high speeds by a spindle motor. Information on the disks is accessed using magnetic read/write heads located on pivoting arms that move the read/write heads over the disks.

Hard disk drives require more than just mechanical components. Modern hard disk drives have sophisticated drive electronics 112 that include an interface for receiving and transmitted signals and data from and to external devices such as the host controller 108, and a Head Disk Assembly Interface (not shown) for interfacing the drive electronics 112 to a head disk assembly (not shown). The head disk assembly includes the disks, the read/write head(s), the spindle motor that rotates the disks, a servo-operated actuator arm that moves the read/write head(s), and other disk drive components. The drive electronics 112 also include servo drivers to move the actuator arms, motor drivers to drive the spindle motor, write drivers to drive the read/write head(s) to write data, an amplifier to amplify data being read, logic to determine where particular data is to be written to or read from, and data formatting electronics to convert incoming data to the proper format for writing and for converting outgoing data to the proper format for the external system. Generally, the drive electronics 112 operate under the control of a processor.

To enable higher speeds and improved performance, modern drive electronics include the buffer memory 114 (RAM) for temporary storing data. For example, data to be written may be temporarily stored in buffer memory 114 until the read/write head(s) are moved to the correct write location(s). Additionally, data that has been read may be stored until data integrity checks have been performed to ensure that the read data is not corrupted. Data may also be temporarily stored in buffer memory 114 until sufficient data is available for efficient transmission, or until an external device calls for the data.

Some prior art disk systems incorporate data prefetching. That is, temporarily storing data for subsequent use in such a manner that disk operations as measured by disk benchmark tests appear faster. For example, in read prefetch, requested data is read and then data at a subsequent location or locations (sectors) of the disk is obtained and temporarily stored for future use. The reason for doing this is that if data at one location is read, the next read is likely to be for data at the next location (because, if possible, data is stored sequentially). By obtaining data at the adjacent locations before it is actually requested, overall read operations can be speed up, improving benchmark performance. If the prefetched data is not asked for, it can be discarded. Write prefetching is similar: data that is to be written onto a disk can be temporarily stored in the buffer memory 114 until the read/write heads are in position to write data. In fact, writing data can be delayed while read operations are being performed. The overall system believes that the writes have been performed when they are only stored. Then, when time is available, the data can be written without slowing the system at all. Read and write prefetching, particularly in combination can dramatically improve disk benchmark results.

High performance computing can use command queuing, which is schematically illustrated in FIG. 2, to implement multiple read requests. As shown, a host controller 202 creates a disk operations list 203 of data that it wants read from and/or written to a disk 204. FIG. 2 shows that list being comprised of three disk operations, designated as tag 0, tag 7, and tag 31, where each tag represents a different data request. In practice, that list 203 can have 32, 64, or more tags. The disk operations list 203 is sent to disk electronics 206 that accepts the disk operations list 203 and begins processing its read and write requests by issuing various commands to read data or to obtain data from the host controller for writing.

An extension of command queuing is out-of-order processing, which is also schematically illustrated in FIG. 2. In out-of-order processing, the disk electronics 206 re-orders the disk operations list 203 and issues a set of commands 208 that do not necessarily follow the order of the disk operations list 203. In fact, the disk electronics 206 orders read and write operations as required to improve disk operations. That is, if a read/write head is in position to read a tag request, the disk electronics causes the data request associated with that tag to be read. Furthermore, the disk electronics can obtain all data that is to be written from the host memory and then store that data in a disk buffer memory. Subsequently, when time is available, that stored data can be written, beneficially after all read operations have been performed. Usually, but not always, requests to obtain write data are sent to the host controller in the order in which they are provided in the disk operations list 203. When the requests are not made in the order found in the disk operations list 203, the disk electronics is said to process write requests out-of-order.

It is possible to save some write data access if the write requests are performed as provided in the disk operations list 203. Since the host controller makes the disk operations list 203, it is aware which write request comes first. The host controller can simply obtain and buffer the first write request in the disk operations list 203. Then, when the disk electronics asks for the data it is immediately available. However, this host controller speculative prefetch is detrimental in out-of-order processing since time is wasted in speculative prefetching.

Prefetching, command queuing, and out-of-order processing have all proven useful. However, such operations are not without their problems. For example, given that write prefetching involves temporarily storing data in a disk buffer memory before actually writing to a disk, if a power failure or some other unusual operation occurs the temporarily stored write data can be lost. Since the host system understands that the data it sent has been written to disk, no protection for that data exists. In that case, the data is permanently lost. Such data loss can be disastrous in critical applications such as those that occur in financial, medical, and military systems. In such systems processing write requests by temporarily storing data in disk buffer memory should not be performed. If not performed, speculatively prefetching will not be helpful since the first write request in the data list is not more likely to be the first requested than any other write request.

Therefore a method and apparatus the selectively uses speculative write prefetching when that technique is useful would be beneficial.

SUMMARY OF THE INVENTION

Embodiments of the principles of the present invention provide for controlled speculative write prefetching.

Some embodiments of the present invention use a queue switch that controls whether write prefetching is to be performed. The state of the queue switch is determined by tracking over time whether speculative write prefetching is or is not beneficial. Some embodiments of the present invention use a queue counter that determines the relative benefit of speculative write prefetching. In some embodiments the state of the queue switch can be controlled (forced) by software, such as when out-of-order processing should be performed.

BRIEF DESCRIPTION OF THE DRAWINGS

The principles of the present invention can be readily understood by considering the following detailed description in conjunction with the accompanying drawings, in which.

DETAILED DESCRIPTION OF THE PREFERRED EMBODIMENTS

Embodiments of the principles of the present invention provide for selective implementation of speculative write prefetching in systems that use command queuing and out-of-order processing.

Figure 1:
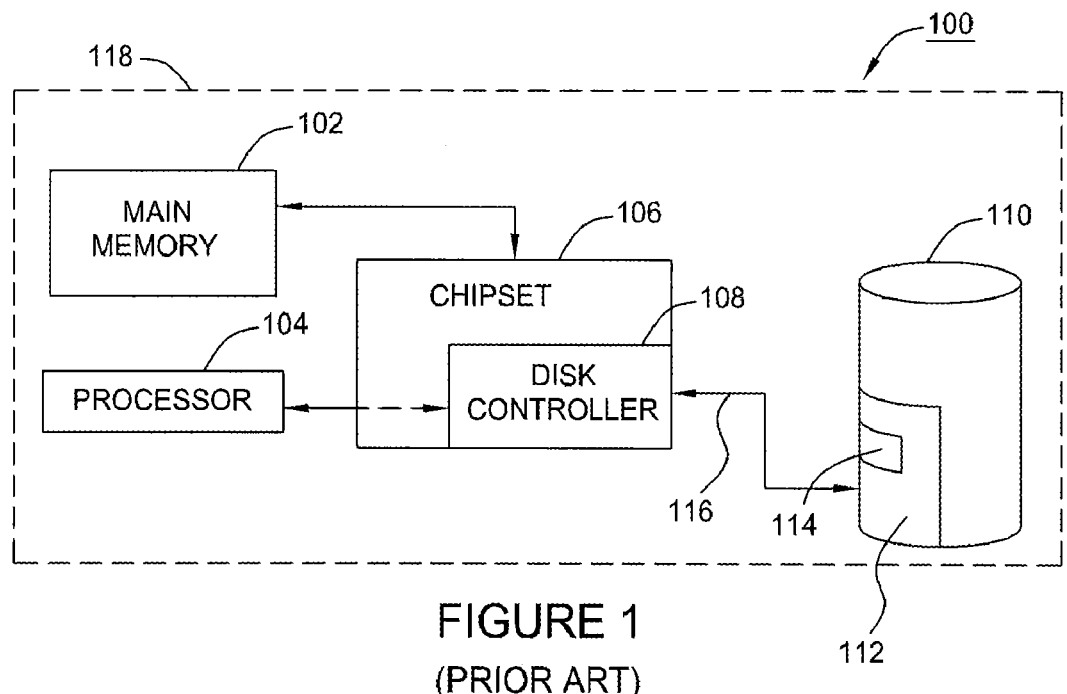
FIG. 1 illustrates a prior art system having computer system.
Figure 2:
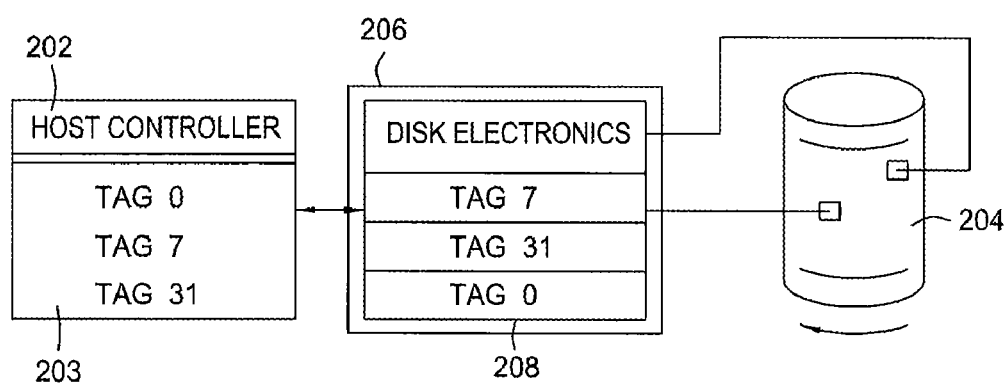
FIG. 2 schematically illustrates command queuing and out-of-order processing.
Figure 3:
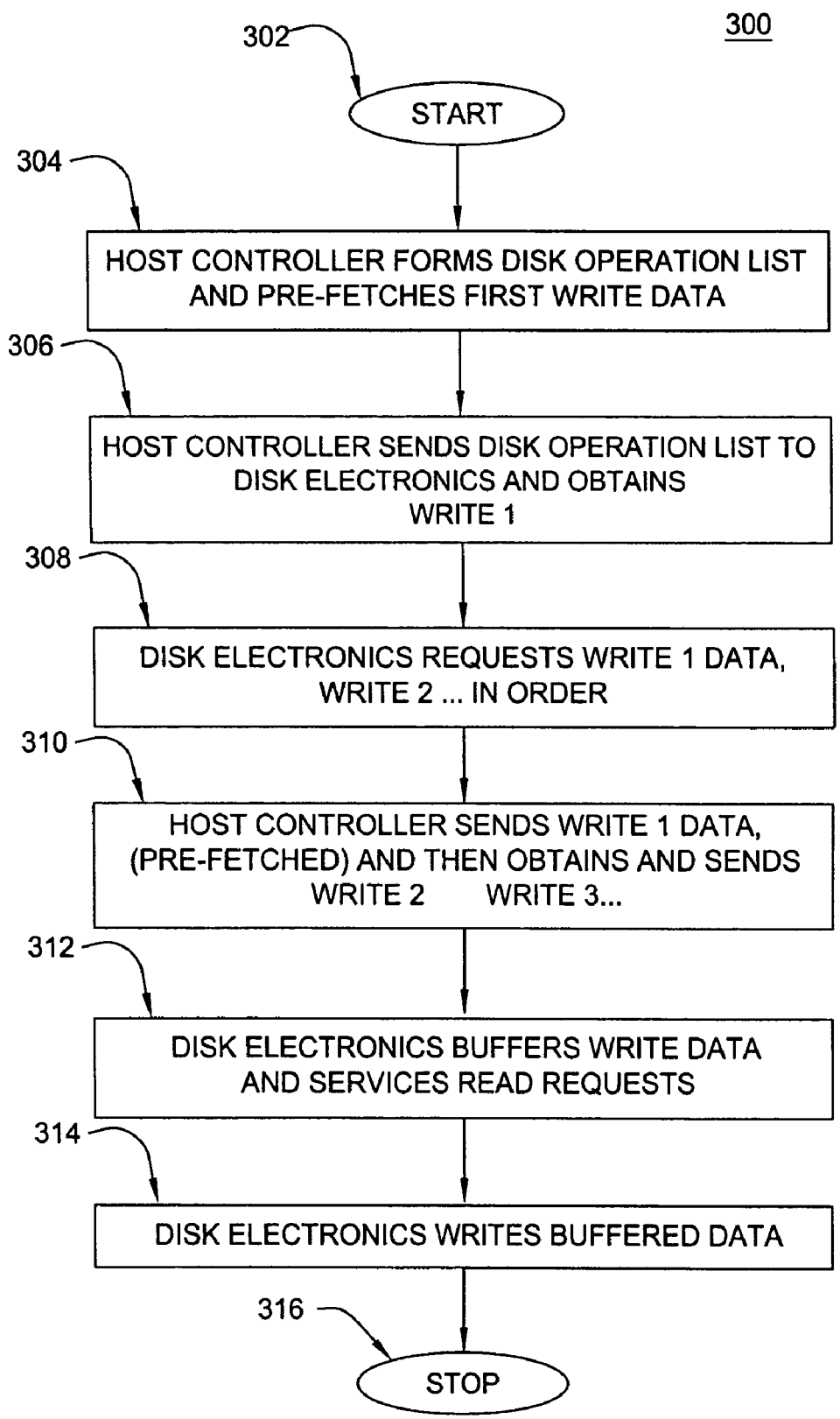
FIG. 3 illustrates a typical speculative write prefetching method.

Because the present invention selectively implements speculative write prefetching it may be beneficial to understand such processing in more detail. FIG. 3 illustrates a typical method 300 of speculative write prefetching. The method 300 starts at step 302 and proceeds at step 304 by the host controller issuing multiple read/write commands in a disk operation list. For example, the disk operation list might be READ 1, READ 2, WRITE 1, READ 3, READ 4, WRITE 2, WRITE 3 .... That disk operation list 202 includes an entry for each read and write requested by the host controller and a tag identifier that accompanies and identifies each request. Thus, each request has an associated tag that can identify it within the disk operation list. A typical system might handle up to 32 tagged requests. The tags are useful in identifying each request if the disk operation list is re-ordered by disk electronics.

At step 306, the host controller sends the disk operation list 203 to disk electronics. The host controller also speculatively prefetches WRITE 1 under the assumption that the disk electronics will request WRITEs in their order in the disk operations list (and thus WRITE 1 would be the first requested). Over time, additional WRITEs are prefetched.

At step 308, the disk electronics requests write data in their order in the disk operation list (in-order). That is, WRITE 1, then WRITE 2, and so on. At step 310, the host controller sends WRITE 1, which was prefetched, and then obtains and sends WRITE 2, WRITE 3, and so on.

At step 312, assuming that a READ request can be performed, the disk electronics buffers the WRITEs and services the READ request(s). If a read request is not outstanding, or after all read requests have been serviced, at step 314 the disk electronics writes the data in its buffer to disk and the process stops at step 316.

While the method 300 is generally successful in that can increase disk benchmark performance, it has a drawback in that it does not allow for controlled speculative write prefetching. That is it operates under the assumption is that the disk electronics will ask for WRITE 1 first. If not, there is no benefit to speculative write prefetching, and, in fact, speculative write prefetching is detrimental. Speculative write prefetching will be detrimental in high reliability systems that do not permit disk buffering of write data. Those systems will use out of order processing. Speculative write prefetching can also be detrimental in some other applications; either always or, more likely, under certain operating conditions. For example, if the disk electronics has a limited buffer capacity and many writes are in the disk operations list, in-order processing may not be called for because it may not be possible for the disk electronics to buffer them until time is available to write them. In that case the disk electronics will ask for write data out-of-order.

Figure 4:
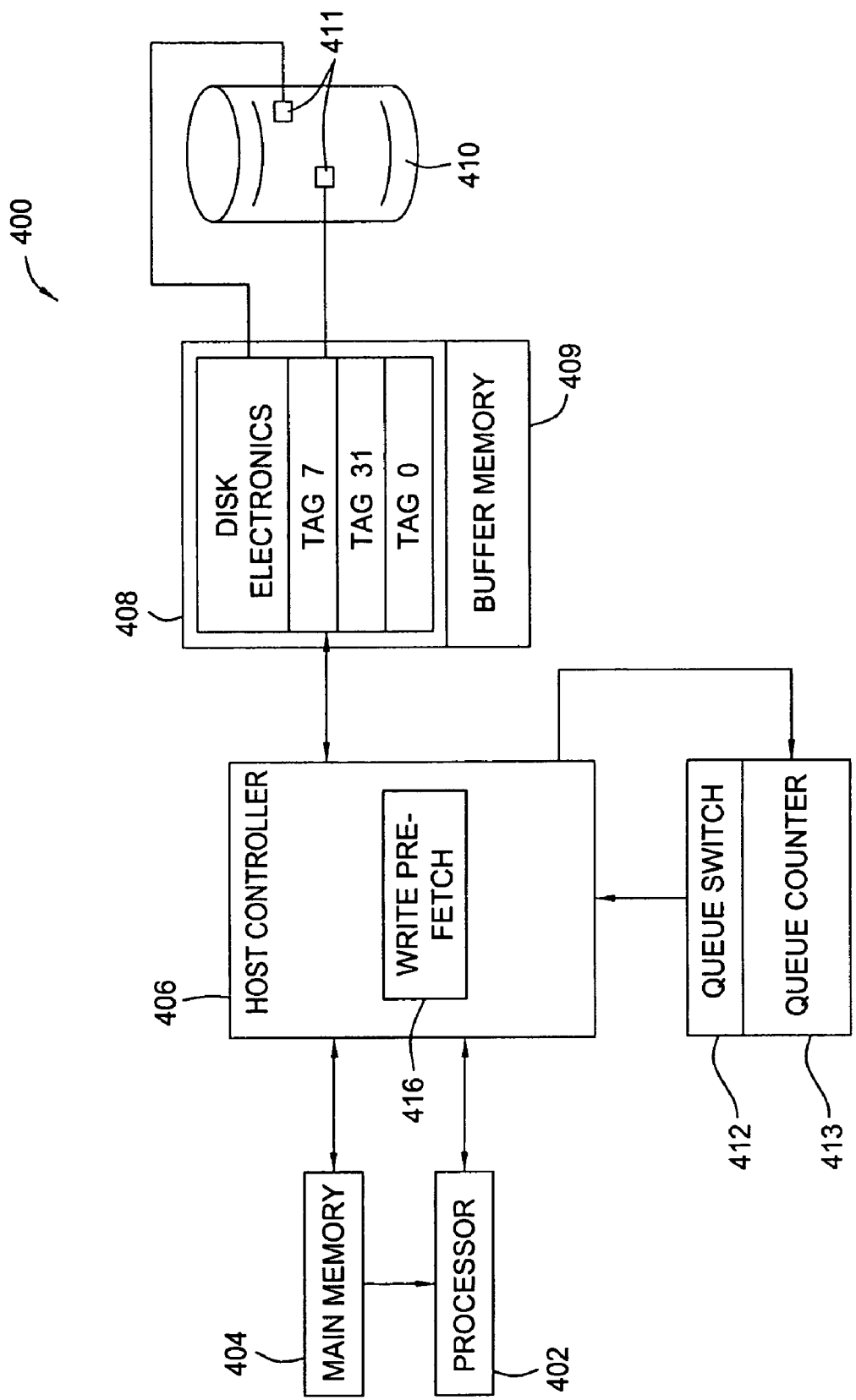
FIG. 4 schematically illustrates a computer system that selectively implements speculative write prefetching in accord with the principles of the present invention.

Because speculative write prefetching can help or hurt, selective speculative write prefetching can be beneficial. FIG. 4 schematically illustrates a computer system 400 that can use speculative write prefetching when beneficial and not use speculative write prefetching when it is not beneficial. The computer system 400 includes a processor 402 and a main memory 404 that stores an operating system, an application program, and data. When data is required to be accessed or saved, the processor 402 communicates with a host controller 406, which in turn communicates with the main memory and/or disk electronics 408, depending on where the requested data is stored or is to be stored. Assuming that the data is to be stored in or read from a disk drive, the host controller 406 formulates and sends a disk operation list containing requests that are to be serviced by the disk electronics 408. The disk operation list includes identifying tags, say tag 7, tag 31, and tag zero, that identify each request. The disk electronics 408 controls the remainder of a hard disk 410, which is shown as having multiple read/write heads 411. The disk electronics 408 includes a prefetch buffer memory 409 that stores prefetched data (both read and write).

The system 400 differs from the system shown in FIG. 3 by having a queue switch 412, a queue counter 413, and a write prefetch memory 416. The state of the queue switch 412 is controlled by the content of the queue counter 413. The queue switch 412 applies a control signal to the host controller 406 that controls whether speculative write prefetching will be performed. The write-prefetch memory 416 buffers the speculative write prefetch data if speculative write prefetching is performed.

Figure 5:
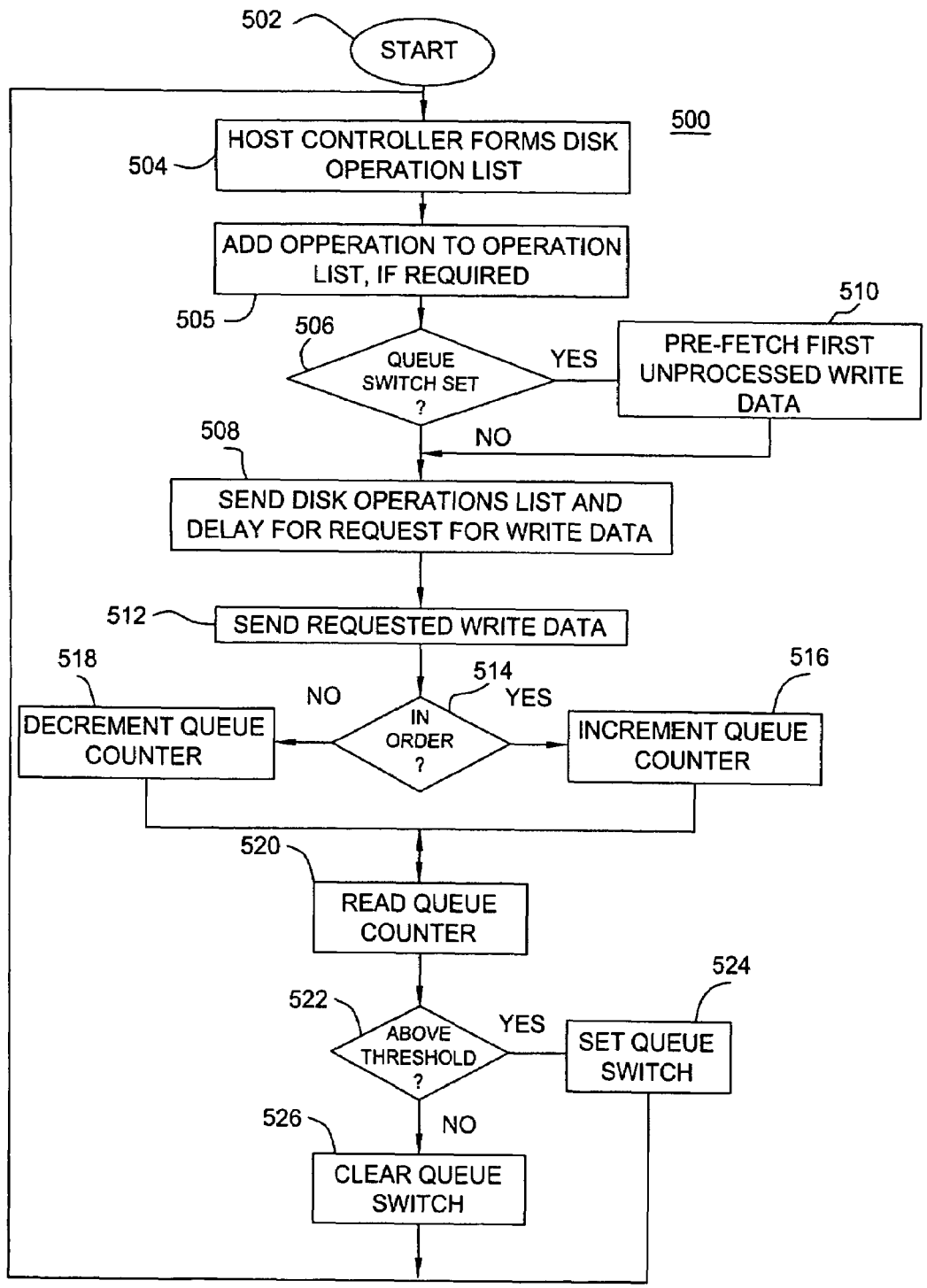
FIG. 5 schematically illustrates speculative write prefetching using the computer system of FIG. 4.

The content of the queue counter 413, which controls the state of the queue switch 412, which selectively enables and disables speculative write prefetching, is determined by a method 500 shown in FIG. 5.

The method 500 starts at step 502 and proceeds at step 504 by the host controller forming a disk operation list 203 comprised of read/write requests and identifying tags. If new read/write request operations are received, at step 505 those operations are added to the disk operation list. Then, at step 506 a determination is made as to whether the queue switch 412 is set. If the queue switch 412 is off, speculative write prefetching is not performed and at step 508 the host controller 406 sends the disk operations list 203 to the disk electronics 408 and then awaits a request for write data. The disk electronics 408 may perform read operations during this delay.

However, if at step 506 the determination is that the queue switch 412 is set, and thus speculative write prefetching is to be performed, at step 510 the host controller prefetches the first un-processed write in the disk operation list and stores that data in the write prefetch memory 416. The method 500 then proceeds to and performs step 508. Eventually, the disk electronics 408 sends a request for write data, and at step 512 the host controller 406 obtains and sends the requested write data to the disk electronics 408.

At step 514 a determination is made as to whether write data was requested in the order WRITE requests occurred in the disk operation list 202. If so, speculative write prefetching would have been, or was, depending on the state of the queue switch 412, beneficial. If so, at step 516 the queue counter 413 is incremented. The maximum value of the queue counter 413 can be limited by register or hardware limitations or, more likely, because the system designer set a predetermined limit to "cap" what is essentially a benefit values assigned to speculative write prefetching. However, if at step 514 it was determined that in-order processing was not performed, and if WRITE requests were not in the order in the operations list (e.g., WRITE 1 was not the first write request), at step 518 the queue counter 413 is decremented. The minimum value of the queue counter 413 can be limited by register or hardware limitations or, by a predetermined minimum.

After step 518 or after step 516, at step 520 the queue counter 413 is read. Then, at step 522 a determination is made as to whether the queue counter 413 is at or above some predetermined threshold number (such as one set by a system designer). Since the content of the queue counter 413 contains an indication of the effectiveness of speculative write prefetching, if the queue counter 413 reading is at or above a threshold number, at step 524 speculative write prefetching is determined to be more beneficial than detrimental and the queue switch 412 is set. However, if the queue counter 413 reading is below the threshold number, at step 526 speculative write prefetching is determined to be more detrimental than beneficial and the queue switch 412 is cleared.

After step 526 or after step 524, system operation loops back to step 504 for the host controller 406 to form another disk operation list.

Figure 6:
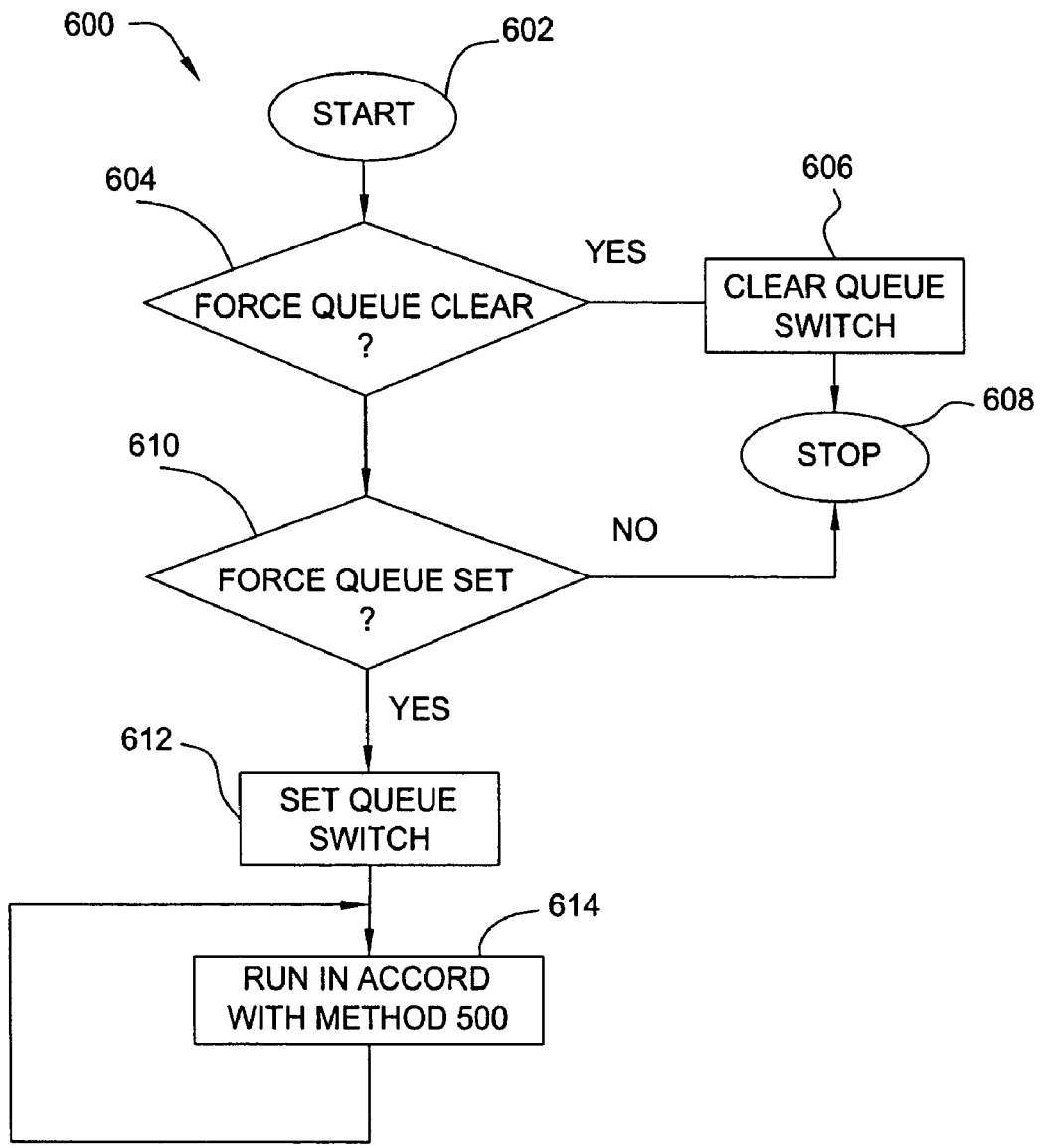
FIG. 6 illustrates a method for forcing speculative write prefetching.

While the method 500 is beneficial, some applications and some systems may chose to force speculative write prefetching either on or off. FIG. 6 illustrates a method 600 of performing this. The method 600 starts at step 602 and proceeds to step 604 where a determination is made as to whether speculative write prefetching is to be disabled (forced off). This can be done in software (such as an application program or by the operating system), or by hardware, such as by setting a switch. If so, the method 600 proceeds to step 606 where the queue switch is cleared, and then the method 600 stops. However, if at step 604 speculative write prefetching is not to be disabled, method 600 proceeds to step 610 where a determination is made as to whether speculative write prefetching is to be enabled (forced on). If so, method 600 proceeds to step 612 where the queue switch is set, and then at step 614 the system follows method 500. However, if at step 610 speculative write prefetching is not to be enabled, the method 600 stops at step 608.

From the foregoing it should be apparent that the system 400 uses out-of-order processing when it is beneficial and prefetching when it is beneficial. Thus, command queuing processing as used in the system 400 benefits both from out-of-order processing and prefetching.

Although the invention has been described with reference to preferred embodiments, workers skilled in the art will recognize that changes may be made in form and detail without departing from the spirit and scope of the invention. The embodiments shown in the figures are provided by way of example only.

What is claimed is:

1. A method of operating a computer comprising the steps of:
   determining if speculative write prefetching is beneficial;
   sending a disk operation list having a write request to a disk drive; and
   speculatively prefetching data to service the write request if speculative write prefetching is determined to be beneficial wherein speculative prefetching includes:
   previously forming multiple disk operation lists having read/write requests;
   servicing the write requests of the previously formed disk operation lists; and
   comparing over a time period how often the write requests of the previously formed disk operation lists were serviced in-order versus how often the write requests were serviced out-of-order, speculative write prefetching only being enabled when write requests are serviced in-order more often than out-of-order.

2. The method of claim 1, wherein comparing is performed by increasing the content of a counter if a write request of a previously formed disk operation list was serviced in-order and by decreasing the content of the counter if the write request of a previously formed disk operation list was serviced out-of-order.

3. The method of claim 1, wherein the disk operation list includes a tag identifier for each request.

4. The method of claim 1, further including sending speculatively prefetched write data to the disk drive.

5. The method of claim 4, wherein the sent speculatively prefetched write data is stored in a disk buffer memory while a read request is serviced.

6. A method of operating a computer comprising the steps of:

determining if speculative write prefetching should be forced on;

determining if speculative write prefetching should be forced off;

if speculative write prefetching should neither be forced on or forced off, determining if speculative write prefetching is beneficial;

if speculative write prefetching is forced on or if speculative write prefetching is beneficial, enabling speculative write prefetching;

sending a disk operation list having a write request to a disk drive; and speculatively prefetching data to service the write request if speculative write prefetching is enabled wherein speculative write prefetching includes:

previously forming multiple disk operation lists having write requests;

servicing the write requests of the previously formed disk operation lists; and comparing over a time period how often the write requests of the previously formed disk operation lists were serviced in-order versus how often the write requests were serviced out-of-order, speculative write prefetching only being enabled when write requests are serviced in-order more often than out-of-order.

7. The method of claim 6, wherein comparing is performed by increasing the content of a counter if write requests of a previously formed disk operation list was serviced in-order and by decreasing the content of the counter if the write requests of a previously formed disk operation list was serviced out-of-order.

8. The method of claim 6, wherein the disk operation list includes a tag identifier for each request.

9. The method of claim 6, further including sending speculatively prefetched write data to the disk drive.

10. The method of claim 6, wherein the sent speculatively prefetched write data is stored in a disk buffer memory while a read request is serviced.

11. An apparatus comprising:

a disk drive for storing data;

a queue switch for selectively controlling speculative write prefetching;

a queue counter for holding a reading that determines the state of the queue switch;

a host controller for sending a disk operation list to the disk drive, wherein the disk operation list includes a write request; and disk electronics for receiving the disk operation list and for sending a command to obtain data for the write request, wherein queue counter reading is increased if write requests are handled in-order and decreased if write request are handled out-of-order, wherein the host controller speculatively prefetches write data only if the queue switch is set, and wherein the host controller does not speculatively prefetch write data if the queue switch is clear.

12. The apparatus of claim 11, further including a prefetch memory for storing speculatively prefetched data.

13. The apparatus of claim 12, wherein software controls whether speculative write prefetching is performed.

* * * * *